(12) United States Patent
Yamazaki et al.

(10) Patent No.: US 11,553,464 B2
(45) Date of Patent: Jan. 10, 2023

(54) RADIO TERMINAL

(71) Applicant: KYOCERA Corporation, Kyoto (JP)

(72) Inventors: Chiharu Yamazaki, Tokyo (JP); Noriyoshi Fukuta, Inagi (JP); Masato Fujishiro, Yokohama (JP); Mayumi Komura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 238 days.

(21) Appl. No.: 16/323,609

(22) PCT Filed: Aug. 7, 2017

(86) PCT No.: PCT/JP2017/028556
§ 371 (c)(1),
(2) Date: Feb. 6, 2019

(87) PCT Pub. No.: WO2018/030327
PCT Pub. Date: Feb. 15, 2018

(65) Prior Publication Data
US 2019/0174479 A1    Jun. 6, 2019

(30) Foreign Application Priority Data

Aug. 10, 2016   (JP) .............................. JP2016-157793

(51) Int. Cl.
| | | |
|---|---|---|
| *H04W 72/04* | (2009.01) | |
| *H04W 72/12* | (2009.01) | |
| *H04L 12/18* | (2006.01) | |
| *H04L 5/00* | (2006.01) | |
| *H04W 24/10* | (2009.01) | |
| *H04W 72/08* | (2009.01) | |

(Continued)

(52) U.S. Cl.
CPC ....... *H04W 72/0406* (2013.01); *H04L 5/0048* (2013.01); *H04L 12/189* (2013.01); *H04W 24/10* (2013.01); *H04W 72/085* (2013.01); *H04W 72/1278* (2013.01); *H04W 72/0413* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2011/0305161 A1* | 12/2011 | Ekpenyong | ............. | H04L 5/001 370/252 |
| 2013/0195008 A1* | 8/2013 | Pelletier | ............... | H04B 7/0417 370/328 |

(Continued)

FOREIGN PATENT DOCUMENTS

| | | |
|---|---|---|
| JP | 2014-519279 A | 8/2014 |
| WO | 2015/094611 A1 | 6/2015 |

*Primary Examiner* — Steve R Young
(74) *Attorney, Agent, or Firm* — Studebaker & Brackett PC

(57) ABSTRACT

A radio terminal performs radio communication with a base station in a mobile communication system. The radio terminal includes a controller configured to perform processing of transmitting an aperiodic CSI feedback related to a downlink channel state to the base station. In response to a predetermined condition being satisfied, the controller performs multiplex transmission in which uplink data in which the aperiodic CSI feedback is multiplexed is transmitted to the base station, by using a PUSCH resource.

10 Claims, 7 Drawing Sheets

(51) Int. Cl.
*H04W 88/02* (2009.01)
*H04W 88/08* (2009.01)

(56) References Cited

U.S. PATENT DOCUMENTS

| | | |
|---|---|---|
| 2014/0185543 A1 | 7/2014 | Kang et al. |
| 2014/0198677 A1* | 7/2014 | Xu .................. H04L 1/0009 370/252 |
| 2014/0204807 A1* | 7/2014 | Li .................... H04L 1/0026 370/277 |
| 2014/0334400 A1* | 11/2014 | Chen ............... H04L 5/1469 370/329 |
| 2014/0334436 A1* | 11/2014 | Qu .................. H04L 5/0055 370/330 |
| 2015/0029964 A1* | 1/2015 | Seo ................. H04L 5/001 370/329 |
| 2015/0208208 A1* | 7/2015 | You ................. H04W 4/06 370/312 |
| 2016/0285535 A1* | 9/2016 | Kim ................ H04L 1/1671 |
| 2017/0208590 A1* | 7/2017 | Kim ................ H04W 72/0446 |
| 2018/0007731 A1* | 1/2018 | Park ............... H04W 76/15 |
| 2018/0115430 A1* | 4/2018 | Seo ................ H04W 76/27 |
| 2018/0212663 A1* | 7/2018 | Liu ................ H04W 24/10 |
| 2018/0262882 A1* | 9/2018 | You ............... H04W 72/005 |
| 2018/0323830 A1* | 11/2018 | Park ............... H04L 5/001 |
| 2019/0116007 A1* | 4/2019 | Yi .................. H04W 72/0453 |
| 2019/0123923 A1* | 4/2019 | Belleschi .......... H04L 1/1671 |

* cited by examiner

RADIO TERMINAL

TECHNICAL FIELD

The present disclosure relates to a radio terminal used in a mobile communication system.

BACKGROUND

In a mobile communication system, a CSI feedback technique for transmitting channel state information (CSI) feedback related to a downlink channel state from a radio terminal to a base station is known. The base station determines a transmission parameter to be applied to downlink data based on the CSI feedback from the radio terminal. The transmission parameter is, for example, a modulation coding scheme (MCS) or the like.

On the other hand, multicast/broadcast transmission is known as a technique for improving the utilization efficiency of downlink radio resources. The base station transmits the same downlink data to a plurality of radio terminals by using the same downlink radio resource.

It is considered that introduction of the CSI feedback technique into such multicast/broadcast transmission makes it possible to achieve efficient data transmission. However, since the CSI feedback results in an increase in signaling between the base station and the radio terminal, the CSI feedback may cause a decrease in utilization efficiency of radio resources.

Therefore, it is desired to realize a CSI feedback technique capable of suppressing an increase in signaling.

SUMMARY

A radio terminal according to one embodiment performs radio communication with a base station in a mobile communication system. The radio terminal comprises a controller configured to transmit an aperiodic Channel State Information (CSI) feedback related to a downlink channel state to the base station. In response to the controller determining that a predetermined condition is satisfied, the controller is configured to transmit the aperiodic CSI feedback in a multiplex transmission to the base station using a Physical Uplink Shared Control Channel (PUSCH) resource. The multiplex transmission includes uplink data multiplexed with the aperiodic CSI feedback.

A radio terminal according to a second aspect performs radio communication with a base station in a mobile communication system. The radio terminal comprises a controller configured to transmit a periodic Channel State Information (CSI) feedback related to a downlink channel state to the base station. The controller is configured to transmit the periodic CSI feedback in a multiplex transmission to the base station using a periodic Physical Uplink Shared Control Channel (PUSCH) resource set by Semi-Persistent Scheduling (SPS). The multiplex transmission comprises uplink data multiplexed with the periodic CSI feedback.

DESCRIPTION OF THE EMBODIMENT

Mobile Communication System

A mobile communication system according to an embodiment will be described. The mobile communication system according to the embodiment is an LTE (Long Term Evolution) system based on 3rd Generation Partnership Project (3GPP) standard.

Figure 1:
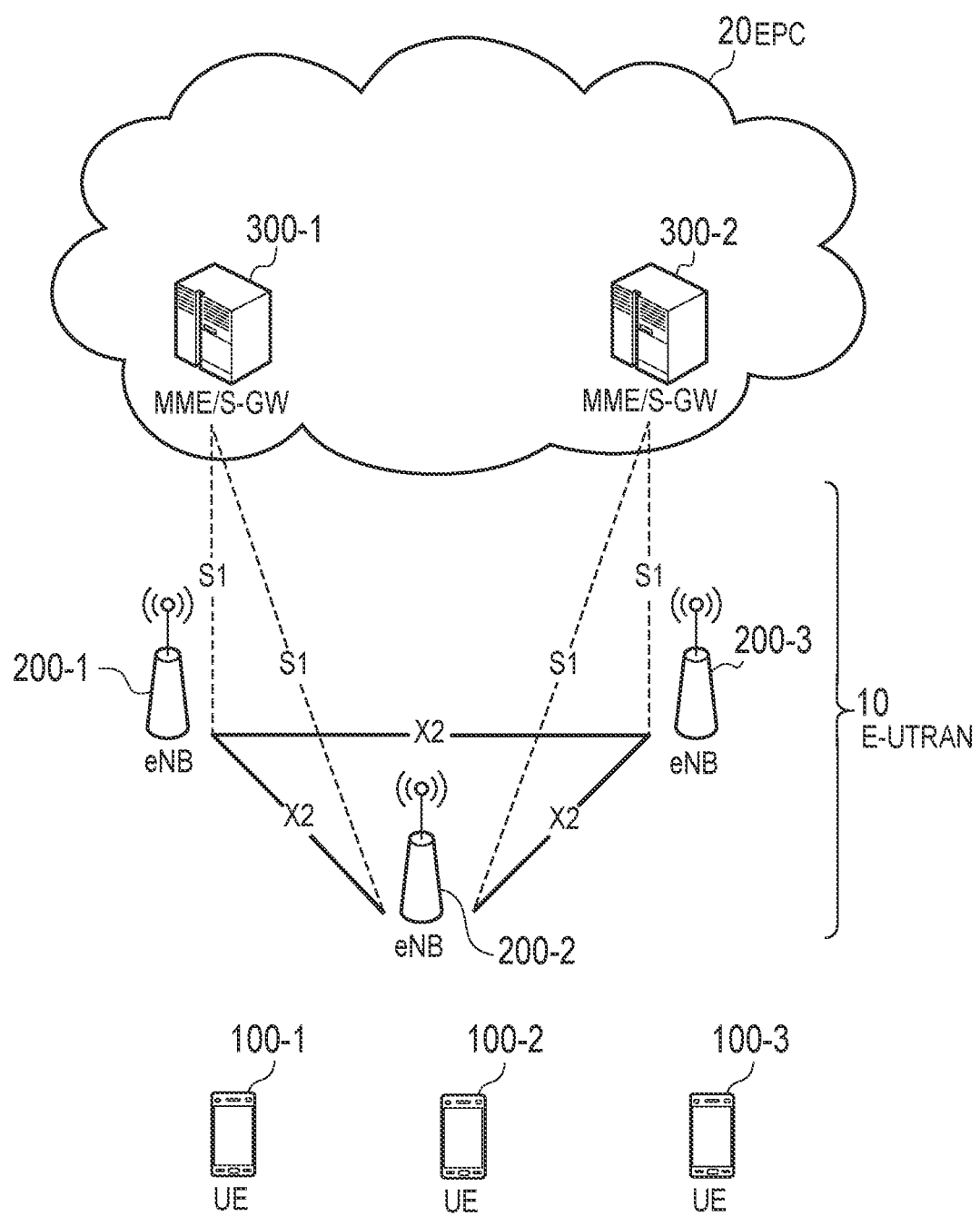
FIG. 1 is a diagram illustrating a configuration of an LTE system according to an embodiment.

FIG. 1 is a diagram illustrating a configuration of an LTE system. As illustrated in FIG. 1, the LTE system includes a radio terminal (UE: User Equipment) 100, a radio access network (E-UTRAN: Evolved-UMTS Terrestrial Radio Access Network) 10, and a core network (Evolved Packet Core) 20.

The UE 100 is a mobile communication device. The UE 100 performs radio communication with the eNB 200 that manages a cell (serving cell) in which the UE 100 exists. The UE 100 may be an in-vehicle type UE (V-UE: Vehicle UE).

The E-UTRAN 10 includes base stations (evolved Node-Bs) 200. The eNB 200s are connected to each other via an X2 interface. The eNB 200 manages one or a plurality of cells. The eNB 200 performs radio communication with the UE 100 that establishes a connection with a cell managed by the eNB 200. The eNB 200 has a radio resource management (RRM) function, a routing function of user data (hereinafter referred to simply as "data"), a measurement control function for mobility control/scheduling, and the like. "Cell" is used as a term indicating the minimum unit of radio communication area. "Cell" is also used as a term indicating a function or resource for performing radio communication with the UE 100.

The EPC 20 includes a mobility management entity (MME) and a serving gateway (S-GW) 300. The MME performs various mobility control and the like for the UE 100. The S-GW performs data transfer control. The MME/S-GW is connected to the eNB 200 via an S1 interface.

Figure 2:
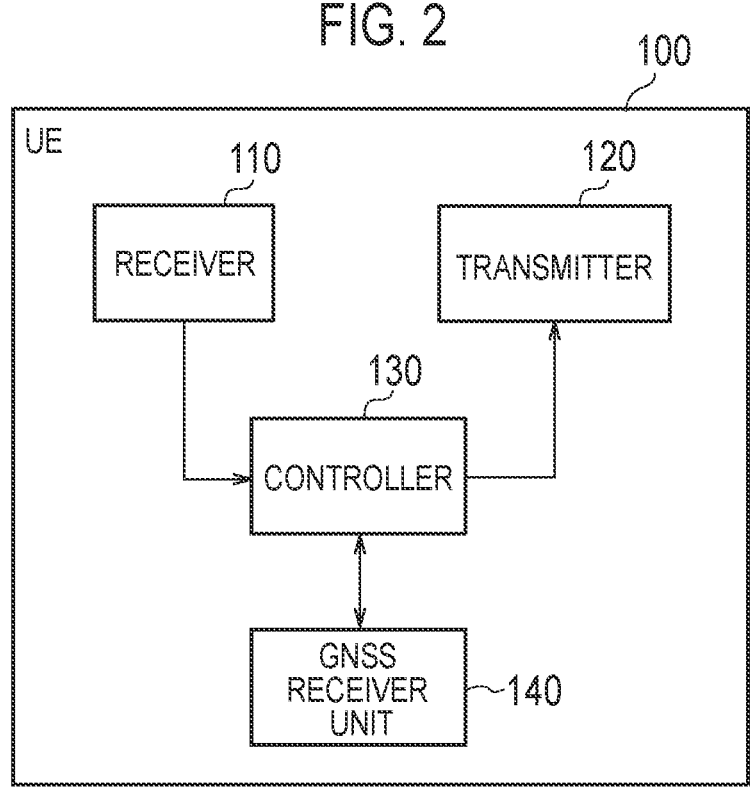
FIG. 2 is a diagram illustrating a configuration of a UE (radio terminal) according to the embodiment.

FIG. 2 is a diagram illustrating a configuration of a UE (radio terminal). As illustrated in FIG. 2, the UE 100 includes a receiver 110, a transmitter 120, a controller 130, and a GNSS (Global Navigation Satellite System) receiver 140.

The receiver 110 performs various types of reception under control of the controller 130. The receiver 110 includes antennas and a receiving machine. The receiving machine converts the radio signal received by the antennas into a baseband signal (reception signal) and outputs it to the controller 130.

The transmitter 120 performs various transmissions under control of the controller 130. The transmitter 120 includes antennas and a transmitting machine. The transmitting machine converts a baseband signal (transmission signal)

output from the controller 130 into a radio signal and transmits it from the antennas.

The controller 130 performs various controls in the UE 100. The controller 130 includes at least one processor and memory. The memory stores programs executed by the processor and information used for processing by the processor. The processor includes a baseband processor and a CPU (Central Processing Unit). The baseband processor performs modulation and demodulation, encoding, decoding, and the like of the baseband signal. The CPU executes various processes by executing programs stored in the memory. The processor executes processes to be described later.

The GNSS receiver 140 receives a GNSS satellite signal under control of the controller 130 and outputs position information indicating the geographical position of the UE 100 to the controller 130. The GNSS may be read as GPS (Global Positioning System). The position information includes latitude and longitude information.

Figure 3:
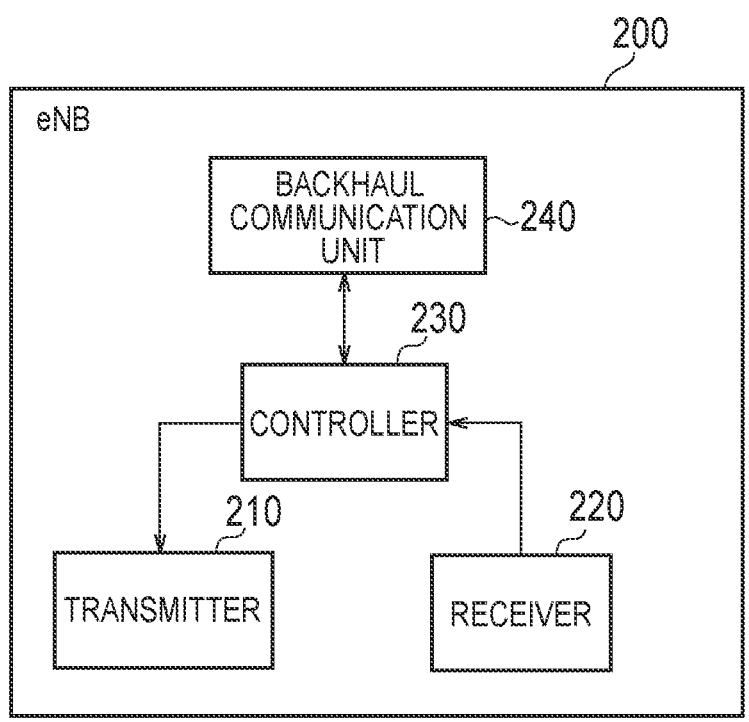
FIG. 3 is a diagram illustrating a configuration of an eNB (base station) according to the embodiment.

FIG. 3 is a diagram illustrating a configuration of an eNB (base station). As illustrated in FIG. 3, the eNB 200 includes a transmitter 210, a receiver 220, a controller 230, and a backhaul communication unit 240.

The transmitter 210 performs various transmissions under control of the controller 230. The transmitter 210 includes antennas and a transmitting machine. The transmitting machine converts a baseband signal (transmission signal) outputted by the controller 230 into a radio signal and transmits it from the antennas.

The receiver 220 performs various types of reception under control of the controller 230. The receiver 220 includes antennas and a receiving machine. The receiving machine converts the radio signal received by the antennas into a baseband signal (received signal) and outputs it to the controller 230.

The controller 230 performs various controls in the eNB 200. The controller 230 includes at least one processor and memory. The memory stores programs executed by the processor and information used for processing by the processor. The processor includes a baseband processor and a CPU. The baseband processor performs modulation and demodulation, encoding, decoding, and the like of the baseband signal. The CPU executes various processes by executing programs stored in the memory. The processor executes processes to be described later.

The backhaul communication unit 240 is connected to the adjacent eNB 200 via the X2 interface. The backhaul communication unit 240 is connected to the MME/S-GW 300 via the S1 interface. The backhaul communication unit 240 is used for communication performed on the X2 interface, communication performed on the S1 interface, and the like.

Figure 4:
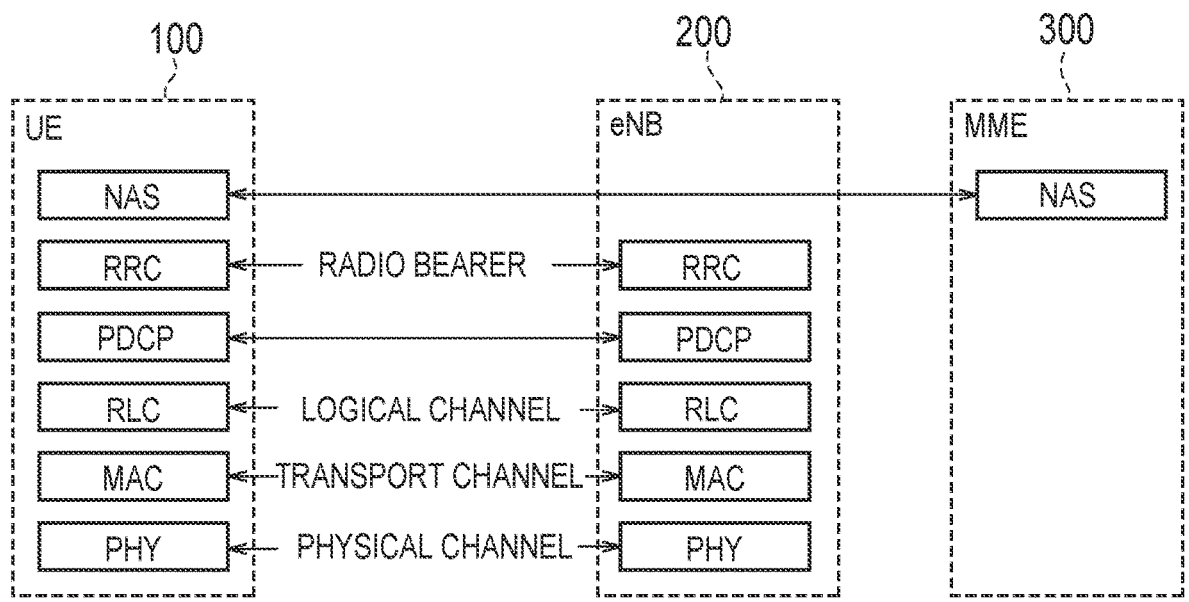
FIG. 4 is a diagram illustrating a configuration of a protocol stack of a radio interface according to the embodiment.

FIG. 4 is a diagram illustrating a configuration of a protocol stack of a radio interface. As illustrated in FIG. 4, the radio interface protocol is divided into the first layer to the third layer of the OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer. The PHY layer, the MAC layer, the RLC layer, the PDCP layer, and the RRC layer constitute an AS (Access Stratum) layer.

The PHY layer carries out coding/decoding, modulation/demodulation, antenna mapping/demapping, resource mapping/demapping. Between the PHY layer of the UE 100 and the PHY layer of the eNB 200, data and control information are transmitted via the physical channel.

The MAC layer performs priority control of data, retransmission processing by hybrid ARQ (HARQ), random access procedure, and the like. Between the MAC layer of the UE 100 and the MAC layer of the eNB 200, data and control information are transmitted via a transport channel. The MAC layer of the eNB 200 includes a scheduler. The scheduler determines the uplink and downlink transport format (transport block size, modulation and coding scheme (MCS)) and the allocated resource block to the UE 100.

The RLC layer uses the functions of the MAC layer and the PHY layer to transmit data to the RLC layer on the receiving side. Between the RLC layer of the UE 100 and the RLC layer of the eNB 200, data and control information are transmitted via logical channels.

The PDCP layer carries out header compression/decompression, encryption/decryption.

The RRC layer is defined only in the control plane handling the control information. Between the RRC layer of the UE 100 and the RRC layer of the eNB 200, RRC signaling for various settings is transmitted. The RRC layer controls logical channels, transport channels, and physical channels in response to establishment, reestablishment and release of radio bearers. If there is a connection (RRC connection) between the RRC of the UE 100 and the RRC of the eNB 200, the UE 100 is in the RRC connected mode. Otherwise, the UE 100 is in the RRC idle mode.

The NAS layer located above the RRC layer performs session management, mobility management, and the like. NAS signaling is transmitted between the NAS layer of the UE 100 and the NAS layer of the MME 300. In addition to the protocol of the radio interface, the UE 100 has a function such as an application layer.

Figure 5:
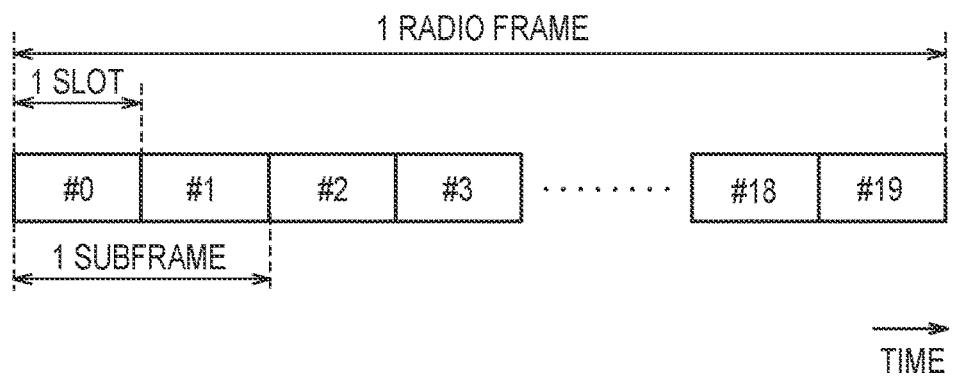
FIG. 5 is a diagram illustrating a configuration of a radio frame used in the LTE system according to the embodiment.

FIG. 5 is a diagram illustrating a configuration of a radio frame used in the LTE system. As illustrated in FIG. 5, the radio frame is composed of ten subframes on the time axis. Each subframe is composed of two slots on the time axis. The length of each subframe is 1 ms. The length of each slot is 0.5 ms. Each subframe includes a plurality of resource blocks (RB) on the frequency axis. Each subframe includes a plurality of symbols on the time axis. Each resource block includes a plurality of sub carriers on the frequency axis. Specifically, one RB is composed of twelve subcarriers and one slot. One symbol and one subcarrier constitute one resource element (RE). Among radio resources (time/frequency resources) allocated to the UE 100, frequency resources can be specified by resource blocks and time resources can be specified by subframes (or slots).

In the downlink, the section of the first several symbols of each subframe is a region used mainly as a physical downlink control channel (PDCCH) for transmitting downlink control information. The remaining part of each subframe is a region that can be mainly used as a physical downlink shared channel (PDSCH) for transmitting downlink data.

Basically, the eNB 200 transmits downlink control information (DCI) to the UE 100 using the PDCCH. The eNB 200 transmits the downlink data to the UE 100 using the PDSCH. The DCI carried by the PDCCH includes uplink scheduling information, downlink scheduling information, and TPC command. The uplink scheduling information is scheduling information (UL grant) related to allocation of uplink radio resources. The downlink scheduling information is scheduling information on allocation of downlink radio resources. The TPC command is information for instructing increase/decrease of uplink transmission power. The eNB 200 includes CRC bits scrambled with an identifier (RNTI: Radio Network Temporary ID) of the destination UE 100 in the DCI in order to identify the UE 100 as the transmission destination of the DCI. Each UE 100 performs blind decoding on the PDCCH by performing a CRC check on the DCI possibly addressed to the UE 100 with the RNTI of the UE 100, and detects the DCI addressed to the UE 100. The PDSCH carries downlink data by a downlink radio resource (resource block) indicated by the downlink scheduling information.

In the uplink, both end portions in the frequency direction in each subframe are mainly used as a physical uplink control channel (PUCCH) for transmitting uplink control information. The remaining part of each subframe is a region that can be mainly used as a physical uplink shared channel (PUSCH) for transmitting uplink data.

Basically, the UE 100 transmits uplink control information (UCI) to the eNB 200 by using the PUCCH. The UE 100 transmits the uplink data to the eNB 200 by using the PUSCH. The UCI carried by the PUCCH includes a CQI (Channel Quality Indicator), a PMI (Precoding Matrix Indicator), an RI (Rank Indicator), a scheduling request (SR), and a HARQ ACK/NACK. The CQI is an index indicating downlink channel quality. The CQI is used for, for example, determining the MCS to be used for downlink transmission. The PMI is an index indicating a precoder matrix preferably used for the downlink transmission. The RI is an index indicating the number of layers (the number of streams) that can be used for the downlink transmission. The SR is information for requesting an allocation of a PUSCH resource. The HARQ ACK/NACK is delivery acknowledgement information indicating whether or not downlink data is correctly received.

The CQI, the PMI, and the RI correspond to channel state information (CSI) related to the downlink channel state. The UE 100 measures (estimates) the channel state by using a reference signal transmitted from the eNB 200 to generate the CSI.

Assumed Scenario

An assumed scenario according to the embodiment will be described. In the embodiment, a scenario of a V2X (Vehicle-to-X) service using the in-vehicle type UE 100 is assumed. In the assumed scenario according to the embodiment, the eNB 200 transmits the same DL data to a plurality of V-UEs using the same DL radio resource by multicast/broadcast transmission.

The multicast/broadcast transmission according to the embodiment is of MBSFN (Multicast-Broadcast Single-Frequency Network) or SC-PTM (Single Cell Point-To-Multipoint). In the MBSFN transmission, multicast/broadcast data is transmitted via a physical multicast channel (PMCH) on an MBSFN area basis, each area being composed of a plurality of cells. In the SC-PTM transmission, multicast data is transmitted on a cell basis via PDSCH. Compared to the MBSFN transmission, the SC-PTM transmission can efficiently provide group communication services (multicast services). In the following, the SC-PTM is mainly assumed as the multicast/broadcast transmission.

Figure 6:
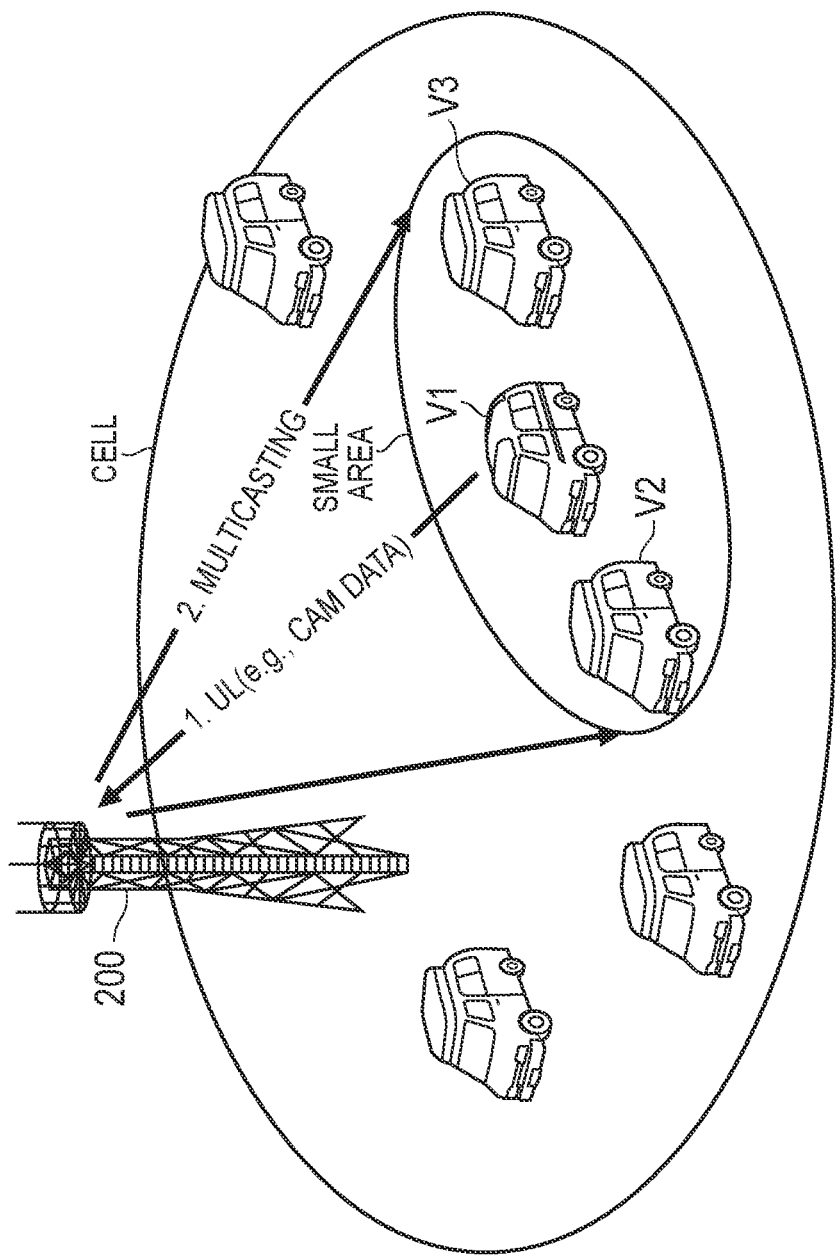
FIG. 6 is a diagram illustrating an assumed scenario according to the embodiment.

FIG. 6 is a diagram illustrating the assumed scenario according to the embodiment. In the assumed scenario according to the embodiment, the eNB 200 performs multicast transmission to a plurality of V-UEs located in a specific position (small area) within the cell managed by the eNB 200 by using the SC-PTM. In other words, the eNB 200 performs multicast on a small area basis based on position information. Such a small area may be referred to as "zone".

However, the eNB 200 is not limited to the case of performing multicast for a small area, and may perform multicast for all areas of the cell managed by the eNB 200.

In the example illustrated in FIG. 6, there are a plurality of vehicles (that is, a plurality of V-UEs) in the cell of the eNB 200.

The eNB 200 (or another network entity) maps TMGIs (Temporary Mobile Group Identities) to the respective zones. The eNB 200 broadcasts or multicasts the correspondence between a zone ID and a TMGI in the cell managed by the eNB 200. The V-UE (transmitter V-UE) mounted on a vehicle V1 transmits the UL data on the vehicle V1 to the eNB 200. The vehicle data is, for example, CAM (Cooperative Awareness Message) data or the like. The eNB 200 (or another network entity) maps the UL data to the TMGI.

The eNB 200 transmits the UL data by DL multicast in association with the TMGI. Data routing from the UL to the DL may be performed within the eNB 200 or via the EPC 20 and/or a server. Each V-UE (receiver V-UE) converts its own latitude and longitude information into a zone ID by using a predetermined rule (for example, a modulo operation). Each V-UE (receiver V-UE) specifies the TMGI corresponding to the zone ID obtained from its own position information, and attempts to receive the multicast data corresponding to the specified TMGI.

In this way, the V-UE of each vehicle (V2 and V3) located in the vicinity of the vehicle V1 receives multicast data related to the vehicle V1 via the network. In other words, the UL data transmitted from the V-UE of the vehicle V1 is transmitted to a predetermined small area (zone) by DL multicast.

It is considered that introduction of the CSI feedback technique into such multicast transmission makes it possible to achieve efficient data transmission. Specifically, the eNB 200 determines transmission parameters (MCS etc.) to be applied to the multicast data based on a CSI feedback from each V-UE. As a result, it is possible to perform multicast transmission adapted to the DL channel state.

There are two methods for CSI feedback: aperiodic CSI feedback and periodic CSI feedback.

In the case of the aperiodic CSI feedback, the UE 100 transmits an aperiodic CSI feedback to the eNB 200 by using a PUSCH resource in response to receiving a transmission instruction (transmission trigger) of the aperiodic CSI feedback from the eNB 200. Such transmission instruction is performed by dynamic scheduling using a DCI (PDCCH). Accordingly, an instruction using the PDCCH is required every time, and the PUSCH resource can be consumed only for the aperiodic CSI feedback.

In the case of the periodic CSI feedback, the UE 100 transmits a periodic CSI feedback to the eNB 200 by using a PUCCH resource. The PUCCH resource is set in the UE 100 by the eNB 200. Accordingly, it is necessary to set the PUCCH resource, and the PUCCH resource can be consumed only for the periodic CSI feedback. Exceptionally, when transmission timing conflicts between the UL data and the CSI feedback, the UE 100 may transmit UL data in which the periodic CSI feedback is multiplexed, by using a PUSCH instead of the PUCCH.

In this way, since the CSI feedback results in an increase in the signaling (that is, overhead) between the eNB 200 and the UE 100, the CSI feedback may cause a decrease in utilization efficiency of radio resources. In particular, when all the V-UEs in the cell perform the CSI feedback, the signaling greatly increases. In the following, a CSI feedback technique capable of suppressing an increase in the signaling will be described.

Aperiodic CSI Feedback

The aperiodic CSI feedback according to the embodiment will be described.

The UE 100 according to the embodiment performs radio communication with the eNB 200. The UE 100 transmits an aperiodic CSI feedback related to the DL channel state to the eNB 200. The CSI is at least one of CQI, PMI, and RI. In the following, a case where the CSI is CQI is mainly assumed. In response to a predetermined condition being satisfied, the UE 100 performs multiplex transmission in which UL data in which the aperiodic CSI feedback is multiplexed is transmitted to the eNB 200, by using a PUSCH resource. Performing such multiplex transmission makes it possible to efficiently transmit an aperiodic CSI feedback to the eNB 200 while suppressing reduction in resource utilization efficiency.

Figure 7:
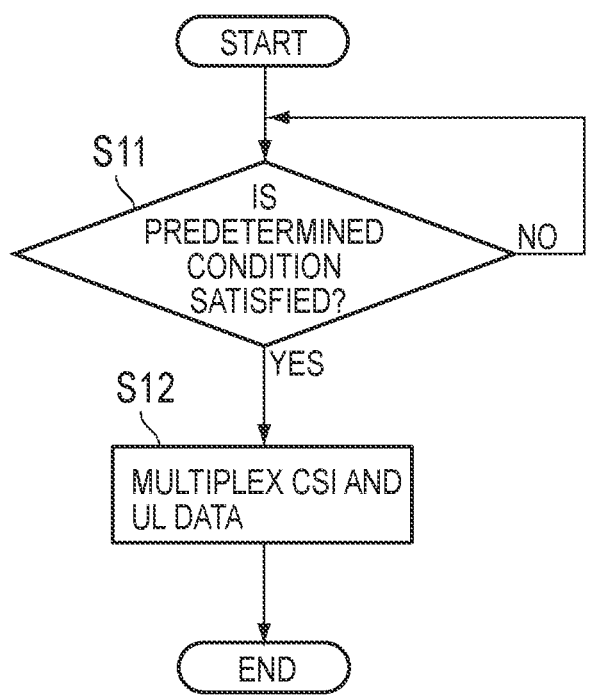
FIG. 7 is a diagram illustrating aperiodic CSI feedback according to the embodiment.

FIG. 7 is a diagram illustrating aperiodic CSI feedback according to the embodiment. As illustrated in FIG. 7, in step S11, the UE 100 determines whether or not a predetermined condition is satisfied. If the predetermined condition is satisfied (step S11: YES), then in step S12, the UE 100 performs the multiplex transmission of the aperiodic CSI feedback and the UL data, by using the PUSCH resource. The UE 100 generates CSI based on a reference signal from the eNB 200 before or after step S11.

The predetermined condition is a condition different from the condition that the transmission instruction for the aperiodic CSI feedback has been received from the eNB 200. Even when the UE 100 does not receive a transmission instruction, the UE 100 performs the multiplex transmission in response to the predetermined condition being satisfied. Accordingly, it is possible to eliminate the transmission instruction by using the DCI (PDCCH), so that it is possible to reduce the DL signaling.

The predetermined condition may include a condition in which data belonging to a specific application, a specific bearer, a specific logical channel, or a specific TMGI is transmitted as the UL data. The specific application, the specific bearer, the specific logical channel, or the specific TMGI may be associated with a service in which the eNB 200 performs multicast/broadcast transmission to at least one or some of the areas of the cell in which the UE 100 is located. The specific application, the specific bearer, the specific logical channel, or the specific TMGI may be specified by the eNB 200.

As an example, the predetermined condition is at least one of the following conditions. When a plurality of conditions are combined, the UE 100 performs the multiplex transmission in response to the plurality of conditions being satisfied. Determination whether or not the predetermined condition is satisfied is performed by a layer/entity belonging to the radio layer (that is, AS layer) of the UE 100.

Condition 1: Condition 1 is a condition that the radio layer (AS layer) of the UE 100 has received a notification that specific data transmission is performed from an upper layer (for example, the application layer). The specific data transmission is data transmission of a V2X service and/or data transmission of a group communication service. In response to Condition 1 being satisfied, the UE 100 multiplexes the UL data (data packet) and the CSI feedback which are related to the specific data transmission onto the PUSCH. Such a service (application) to be subjected to the multiplex transmission may be set in the UE 100 by the eNB 200.

The setting for the UE 100 by the eNB 200 (that is, transmission of setting information) may be performed by an RRC signaling. The RRC signaling may be a UE-dedicated RRC signaling (for example, an RRC Connection Reconfiguration message). The RRC signaling may be a broadcast RRC signaling (for example, an SIB (System Information Block)). Alternatively, the setting for the UE 100 by the eNB 200 may be performed by a multicast channel (for example, an SC-MCCH (Single Cell-Multicast Control Channel)). The same applies, below.

Condition 2: Condition 2 is a condition that the UE 100 has caused data transmission in a specific radio bearer (or a specific logical channel). In response to Condition 2 being satisfied, the UE 100 multiplexes the UL data (data packet) and the CSI feedback which belong to the specific radio bearer (or the specific logical channel) onto the PUSCH. The specific radio bearer (or the specific logical channel) may be set in the UE 100 by the eNB 200 as a bearer ID (or a logical channel ID). Alternatively, the specific radio bearer (or the specific logical channel) may be notified from an upper layer (for example, the application layer).

Condition 3: Condition 3 is a condition that the UE 100 performs data transmission belonging to a specific TMGI. In response to Condition 3 being satisfied, the UE 100 multiplexes the UL data (data packet) and the CSI feedback which belong to the specific TMGI onto the PUSCH. The specific TMGI may be set in the UE 100 by the eNB 200. Alternatively, the specific TMGI may be notified from an upper layer (for example, the application layer). The specific TMGI may be a TMGI being transmitted (or scheduled to transmit) by the MBSFN or the SC-PTM.

Condition 4: Condition 4 is a condition that a predetermined multicast/broadcast service is provided in the cell in which the UE 100 is located (for example, the MBSFN or the SC-PTM is set in the UE 100 by the eNB 200).

However, the predetermined condition may be a condition that a transmission instruction for the aperiodic CSI feedback has been received from the eNB 200. In this case, the UE 100 performs the multiplex transmission in response to explicitly receiving the aperiodic CSI feedback instruction from the eNB 200. The CSI feedback indication is transmitted in a predetermined DCI format.

Periodic CSI Feedback

The periodic CSI feedback according to the embodiment will be described.

The UE 100 according to the embodiment performs radio communication with the eNB 200. The UE 100 transmits a periodic CSI feedback related to the DL channel state to the eNB 200. The UE 100 performs multiplex transmission in which UL data in which the periodic CSI feedback is multiplexed is transmitted to the eNB 200, by using a periodic PUSCH resource set by semi-persistent scheduling (SPS). In the SPS, it is not necessary for the eNB 200 to allocate the PUSCH resource to the UE 100 by using the DCI (PDCCH) every time. Accordingly, performing such multiplex transmission makes it possible to efficiently transmit the periodic CSI feedback to the eNB 200 while suppressing reduction in resource utilization efficiency.

Figure 8:
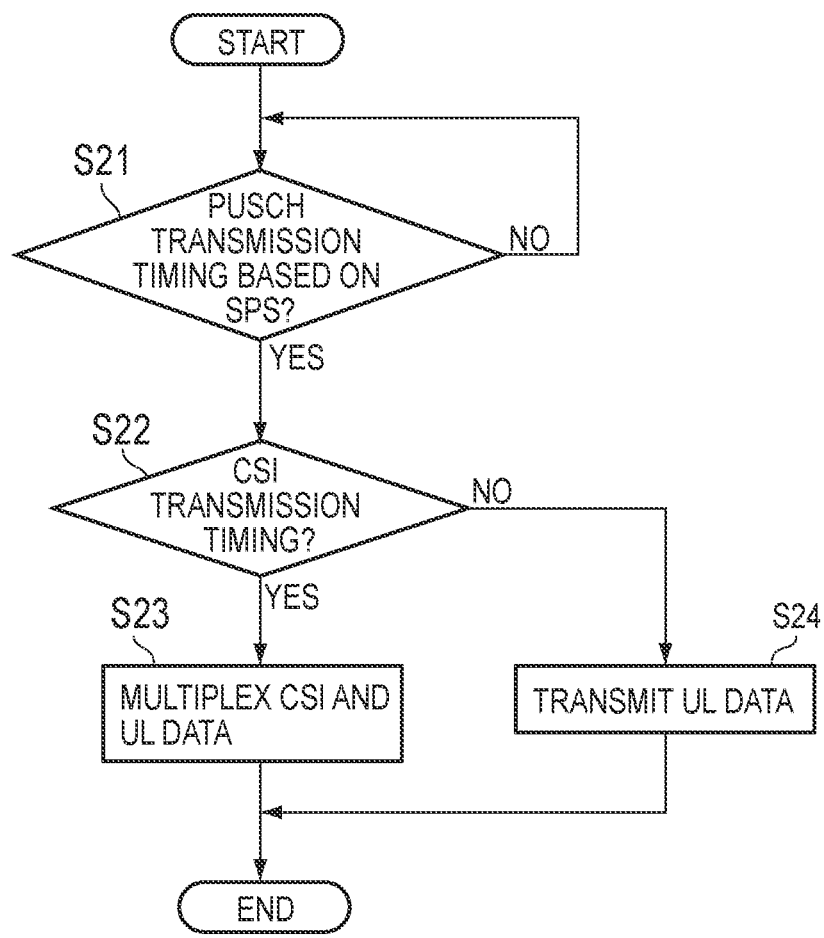
FIG. 8 is a diagram illustrating periodic CSI feedback according to the embodiment.

FIG. 8 is a diagram illustrating periodic CSI feedback according to the embodiment. As illustrated in FIG. 8, in step S21, the UE 100 determines whether or not a PUSCH transmission timing by the SPS has arrived. If the PUSCH transmission timing by the SPS has arrived (step S21: YES), then in step S22, the UE 100 determines whether or not a CSI transmission timing has arrived. If the CSI transmission timing has arrived (step S22: YES), then in step S23, the UE 100 performs the multiplex transmission of the periodic CSI feedback and the UL data by using the PUSCH resource.

In the embodiment, the UE 100 may receive setting information (SPS radio resource setting) related to the SPS from the eNB 200. The setting information includes information for setting at least one of a transmission cycle of the periodic CSI feedback and a transmission MCS. Such setting information may be defined as, for example, "UL SPS configuration intended for V2X transmission" as the SPS setting for V2X. Alternatively, all the UL SPSs may be targeted by notifying, to the UE 100 from the eNB 200, an indicator indicating that all the UL SPS settings are the operations according to the present embodiment.

The transmission cycle of the CSI feedback may be a cycle longer than an SPS cycle (PUSCH transmission cycle) (that is, a subset of the SPS cycle). If the transmission cycle of the CSI feedback is the subset of the SPS cycle, the transmission cycle of the CSI feedback may be set as a multiple of the SPS cycle. As an example, '(SPS cycle)× "N"=CSI FB cycle' is set.

The SPS radio resource setting may include information specifying MCS change at the timing of the CSI feedback. The MCS change may be to apply a higher MCS so as to allow for an increase in the number of transmission bits due to the CSI feedback. The information specifying MCS change is one of the followings.

Identifier indicating whether or not to perform MCS change (for example, a 1-bit flag) In this case, the correspondence (table) between the MCS allocated by the DCI (PDCCH) and the changed MCS is prescribed in advance, and the UE 100 and the eNB 200 may store the correspondence. As an example, it is considered that the correspondence is such as "Change MCS 08 to MCS 09" and "Change MCS 09 to MCS 10". The changed MCS may be defined as a minimum change range of the allowable number of bits of the CSI feedback with respect to the allocated MCS. As an example, it is considered a change method "MCS 08+4 bits=MCS 09". However, since the transport block size (TBS) is determined by the combination of the MCS and the number of allocated resource blocks, the correspondence (table) between the allocated MCS and the changed MCS may be defined for each of the numbers of allocated resource blocks (or its range). In this case, the UE 100 and the eNB 200 identify the correspondence between the allocated MCS and the changed MCS according to the number of allocated resource blocks, and then change the MCS. Also in the following example, the number of allocated resource blocks may be taken into consideration.

MCS applied when changing MCS (for example, "MCS 8")

Difference (offset) between MCS applied when changing MCS and allocated MCS As an example, when the difference, delta is 2, it is changed as 'MCS 8+"delta 2"=MCS 10'.

The periodic CSI feedback according to the embodiment may be used in combination with the aperiodic CSI feedback according to the embodiment.

Example of Operation Sequence

An example of an operation sequence according to the embodiment will be described.

Figure 9:
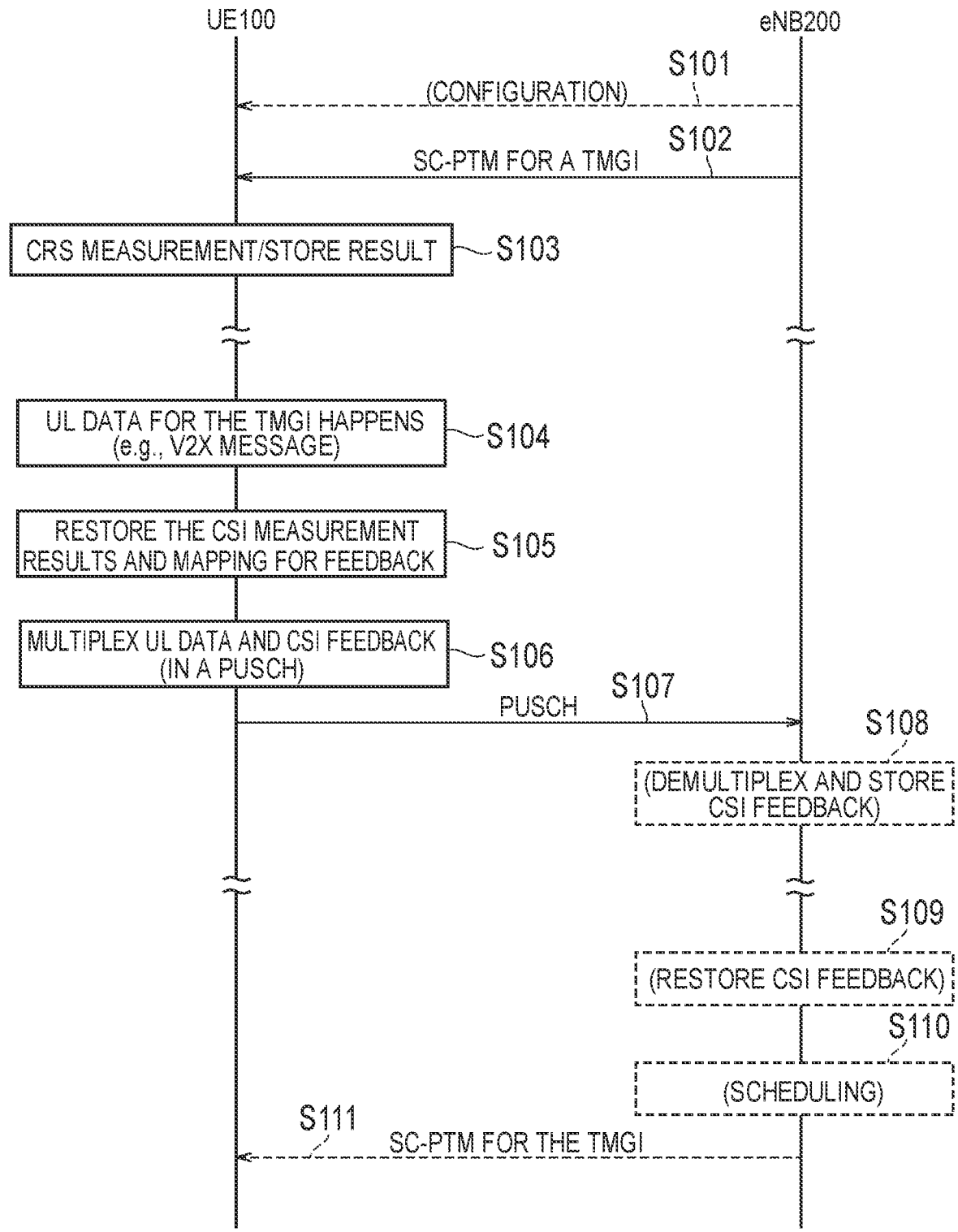
FIG. 9 is a diagram illustrating an example of an operation sequence according to the embodiment.

FIG. 9 is a diagram illustrating the example of the operation sequence according to the embodiment. Each process indicated by the broken line in FIG. 9 means an optional process.

As illustrated in FIG. 9, in step S101, the eNB 200 transmits the setting information described above to the UE 100. The UE 100 receives the setting information to be stored.

In step S102, the eNB 200 transmits multicast data associated with a specific TMGI by SC-PTM transmission. The UE 100 receives the multicast data.

In step S103, the UE 100 measures CSI by measurement with respect to the reference signal transmitted from the eNB 200, and stores the measured CSI. The reference signal is, for example, a cell-specific reference signal (CRS) or the like.

In step S104, the UE 100 generates UL data corresponding to the specific TMGI. The UL data is, for example, a V2X message or the like.

In step S105, the UE 100 reads the CSI measurement result and maps it to CSI for feedback. The UE 100 may generate a MAC control element (MAC CE) including the CSI feedback.

In step S106, the UE 100 multiplexes the UL data and the CSI feedback onto the PUSCH.

In step S107, the UE 100 transmits to the eNB 200 the UL data and the CSI feedback which are multiplexed onto the PUSCH. The UE 100 may further multiplex information (flag) indicating multiplex transmission onto the PUSCH.

In step S108, the eNB 200 demultiplexes the multiplexed UL data and CSI feedback and stores the CSI feedback. The eNB 200 may perform blind decoding for each pattern of whether or not the CSI feedback is multiplexed (2 patterns), thereby separating the UL data and the CSI feedback from each other. Alternatively, the eNB 200 may determine whether or not the CSI feedback is multiplexed based on information (flag) indicating the multiplex transmission, and separate the UL data and the CSI feedback from each other based on the determination result.

In step S109, the eNB 200 reads the stored CSI feedback.

In step S110, the eNB 200 performs scheduling for determining transmission parameters to be applied to the multicast data based on the CSI feedback. The transmission parameters may include at least one of an MCS and the number of repeated transmissions. The eNB 200 may regard the CSI feedback to be valid until a predetermined time elapses from the reception of the CSI feedback.

In step S111, based on the scheduling result, the multicast data associated with the specific TMGI is transmitted by SC-PTM transmission.

Reference Signal According to Embodiment

The reference signal according to the embodiment will be described.

As described above, the UE 100 measures the DL channel state based on the reference signal transmitted from the eNB 200. The reference signal is selected from an MBSFN reference signal (MBSFN-RS), a cell-specific reference signal (CRS), a demodulation reference signal (DMRS), and a CSI reference signal (CSI-RS). The UE 100 may determine the type of the reference signal used for measuring the channel state according to whether MBSFN transmission or SC-PTM transmission is set in the UE 100 by the eNB 200.

As an example, if the MBSFN is set, the UE 100 measures the MBSFN-RS. The UE 100 may perform measurement on at least one of the MBSFN-RS, the DMRS, and the CSI-RS.

On the other hand, if the SC-PTM is set, the UE 100 performs measurement on the CRS. The UE 100 may perform measurement on at least one of the CRS, the DMRS, and the CSI-RS.

For example, if the MBSFN/SC-PTM schemes are both set, the UE 100 may perform measurement on both the MBSFN-RS and the CRS. Alternatively, even if the MBSFN/SC-PTM schemes are both set, the UE 100 may measure only the RS related to the scheme multicasting the related TMGI.

Alternatively, the eNB 200 may explicitly set the type of the RS to be measured in the UE 100. The eNB 200 may set detailed information (for example, subframe/frequency to be measured, etc.) related to the RS to be measured in the UE 100.

The UE 100 performs the CSI feedback (multiplex transmission) according to the measurement method as described above.

As an example, if the MBSFN is set, the UE 100 performs the CSI feedback based on the measurement result of the MBSFN-RS. The UE 100 may perform the CSI feedback based on the measurement result of at least one of the MBSFN-RS, the DMRS, and the CSI-RS.

On the other hand, if the SC-PTM is set, the UE 100 performs the CSI feedback based on the measurement result of the CRS. The UE 100 may perform the CSI feedback based on the measurement result of at least one of the CRS, the DMRS, and the CSI-RS.

For example, if the MBSFN/SC-PTM schemes are both set, the UE 100 may perform the CSI feedback based on the measurement results of both the MBSFN-RS and the CRS. Alternatively, even if the MBSFN/SC-PTM schemes are both set, the UE 100 may perform the CSI feedback based on the measurement result of only the RS related to the scheme multicasting the related TMGI.

Alternatively, the eNB 200 may explicitly set the type of the RS as the feedback target (multiplex transmission target) in the UE 100. The eNB 200 may set detailed information (for example, subframe/frequency to be measured, etc.) related to the RS as the feedback target in the UE 100.

First Modification

In the multiplex transmission according to the above-described embodiment, the UE 100 may transmit not only the CSI feedback but also additional information by multiplex transmission.

As an example, the UE 100 may multiplex its own position information together. The position information may be latitude and longitude information, or may be information indicating a zone. The information indicating the zone may be a zone ID or information used for obtaining the zone ID (for example, information indicating the reference point/width/length of the zone).

As another example, the UE 100 may multiplex a HARQ ACK/NACK together. In the assumed scenario described above, the receiver V-UE is located in the vicinity of the transmitter V-UE. Accordingly, successful/failed reception of the multicast data in the transmitter V-UE is correlated with successful/failed reception of the receiver V-UE in the vicinity of the transmitter V-UE. Therefore, the eNB 200 performs link adaptation and/or retransmission control of the multicast data based on the HARQ ACK/NACK from the transmitter V-UE.

When such additional information is also transmitted by the multiplex transmission, the UE 100 may add an identifier indicating the type of the additional information to be transmitted to transmit the additional information.

Second Modification

In the above-described embodiment, multi-antenna transmission technique has not been specifically mentioned. However, when the eNB 200 transmits the multicast data to one or some of the areas (zones) in the cell, advanced transmission technique such as beam forming and/or MIMO (Multiple-Input Multiple-Output) can be applied. In order to apply such advanced transmission technique, it is desirable to use the CSI-RS as the reference signal, and the CSI feedback preferably includes the PMI and the RI.

As an example, the eNB 200 transmits the CSI-RS in a subframe in which the multicast data is transmitted in the SC-PTM. In the subframe in which the multicast data is transmitted in the SC-PTM, the UE 100 performs measurement on the CSI-RS. In that case, for example, the CSI-RS transmission resource may be different for each TMGI. The transmission resource may be a resource element in which the CSI-RS is arranged. Such a transmission resource (pattern) may be set in the UE 100 by the eNB 200.

As another example, the MIMO for each zone may be applied to the MBSFN/SC-PTM transmission. Specifically, the eNB 200 performs the MIMO on a group made up of a plurality of UEs 100 in one zone. Such a MIMO may be referred to as an MG-MIMO (Multi-group MIMO). In the MG-MIMO, the eNB 200 may perform MIMO transmission by using a transmission weight according to group-based channel information.

Third Modification

In the above-described embodiment, a possibility of simultaneous transmission of the PUCCH and the PUSCH is not mentioned particularly. However, if "simultaneous PUCCH-PUSCH-r 10" which is a parameter set in the UE 100 by the eNB 200 is TRUE, the UE 100 can perform simultaneous transmission of the PUCCH and the PUSCH.

Accordingly, the periodic CSI feedback according to the above-described embodiment may be changed as follows. If the periodic CSI feedback and a specific UL SPS are set and "simultaneous PUCCH-PUSCH-r10" is FALSE (that is, if setting in which the CSI feedback is multiplexed onto the PUSCH is provided because the simultaneous transmission of the PUCCH and the PUSCH is impossible), the UE 100 stops (drops) the transmission of a specific CSI feedback in response to the timing of the specific CSI feedback coinciding with the transmission timing of the SPS. In other words, when the timing of the specific CSI feedback conflicts with the specific SPS transmission timing, the UE 100 does not transmit the specific CSI feedback in order to preferentially transmit the UL data. As a result, an increase in transmission data due to multiplexing of the CSI feedback does not occur, and it is possible to suppress delay due to the fact that the UL transmission data cannot be transmitted at one time. Since the conflict of timing as described above can be determined at the eNB 200 end, the eNB 200 does not regard the fact that the specific CSI feedback is not transmitted to the eNB 200 as an error.

Further, the UE 100 may perform operations taking into consideration the situation of the UL transmission data. The precondition is that the periodic CSI feedback and the specific UL SPS are set in the UE 100 and "simultaneous PUCCH-PUSCH-r10" is FALSE. Under such a precondition, even if the timing of the specific CSI feedback and the transmission timing of the SPS coincide (conflict) with each other, the UE 100 may perform the multiplex transmission of the CSI feedback by using the UL SPS resource when UL transmission data does not occur (or if the TBS has a margin even after the CSI feedback is transmitted in addition to the UL transmission data). When such an exceptional operation is introduced, a method of determining at the eNB 200 end whether or not the UE 100 has dropped the CSI feedback at the time of the conflict of timing may be introduced. As an example, any one of the following methods can be used.

1) The eNB 200 performs two patterns of blind decoding (attempts to decode twice by multiplexing/dropping).

2) The UE 100 transmits a drop flag indicating that it has been dropped to the eNB 200 (included in the MAC Control Element etc.).

3) The CSI feedback is included in the MAC Control Element. The eNB 200 can perform the determination by the length of the MAC Control Element.

Other Embodiments

In the above-described embodiment, the scenario in which the multicast/broadcast transmission is performed in V2X communication using the in-vehicle type UE 100 is mainly assumed. However, not only the scenario in which the V2X communication is performed but also a scenario in which normal cellular communication (unicast communication) is performed between the UE 100 and the eNB 200 may be assumed.

In the above-described embodiment, the scenario in which the multicast/broadcast transmission is performed for at least one or some of the areas of one cell is mainly assumed. However, a scenario in which the multicast/broadcast transmission is performed for an MBSFN area composed of a plurality of cells may be assumed. In such a scenario, a predetermined network entity such as an MCE (Multi-Cell/Multicast Coordinating Entity) may perform link adaptation (MCS determination or the like) on an MBSFN area basis. The eNB 200 may report channel information of a radio link on which the multicast/broadcast is being performed, to the predetermined network entity. The channel information may be, for example, the CSI feedback received from the UE 100 or CSI information estimated by the eNB 200. The eNB 200 may add related information, such as the corresponding TMGI, MBMS service, session ID, zone ID, to the channel information.

In the above-described embodiment, the LTE system is exemplified as the mobile communication system. However, the present invention is not limited to the LTE system. The present invention may apply to systems other than the LTE system.

The entire content of Japanese Patent Application No. 2016-157793 (filed on Aug. 10, 2016) is incorporated in the present specification by reference.

INDUSTRIAL APPLICABILITY

The present invention is useful in the field of mobile communication.

The invention claimed is:

1. A user equipment comprising:
a controller configured to transmit an aperiodic Channel State Information (CSI) feedback related to a downlink channel state to a base station,
wherein in response to the controller determining that a predetermined condition is satisfied, the controller is configured to transmit the aperiodic CSI feedback in a multiplex transmission to the base station using a Physical Uplink Shared Control Channel (PUSCH) resource, the multiplex transmission including uplink data multiplexed with the aperiodic CSI feedback,
the controller is configured to receive, from the base station, a type of a reference signal used for measuring the downlink channel state and a resource set of the reference signal,
the type of the reference signal is a Multicast-Broadcast Single-Frequency Network Reference Signal (MBSFN-RS) when Multicast-Broadcast Single-Frequency Network (MBSFN) transmission is set in the user equipment by the base station, and
the type of the reference signal is a Cell-specific Reference signal (CRS) when Single Cell Point-To-Multipoint (SC-PTM) transmission is set in the user equipment by the base station.

2. The user equipment according to claim 1, wherein
the controller is configured to receive a transmission instruction for the aperiodic CSI feedback from the base station, and
the controller transmits the multiplex transmission in response to the predetermined condition being satisfied even when the transmission instruction is not received from the base station.

3. The user equipment according to claim 1, wherein
the predetermined condition includes a condition in which data belonging to a specific application, a specific bearer, a specific logical channel, or a specific Temporary Mobile Group Identities (TMGI) is transmitted as the uplink data.

4. The user equipment according to claim 3, wherein
the specific application, the specific bearer, the specific logical channel, or the specific TMGI is associated with a multicast/broadcast service provided by the base station for at least one or some of areas of a cell in which the user equipment is located.

5. The user equipment according to claim 3, wherein
the specific application, the specific bearer, the specific logical channel, or the specific TMGI is specified by the base station.

6. The user equipment according to claim 2, wherein
the predetermined condition includes a multicast/broadcast condition that a predetermined multicast/broadcast service is provided in a cell in which the user equipment is located.

7. The user equipment according to claim 1, wherein
the CSI feedback transmitted by the multiplex transmission is used in the base station to determine a transmission parameter to be applied to multicast/broadcast transmission.

8. The user equipment according to claim 1, wherein
the reference signal is selected from a Multicast-Broadcast Single-Frequency Network Reference Signal (MBSFN-RS), a Cell-specific Reference signal (CRS), a Demodulation Reference Signal (DMRS), and a CSI Reference Signal (CSI-RS).

9. A base station comprising:
a controller configured to receive an aperiodic Channel State Information (CSI) feedback related to a downlink channel state from a user equipment,
wherein the controller is configured to receive the aperiodic CSI feedback in a multiplex transmission from the user equipment using a Physical Uplink Shared Control Channel (PUSCH) resource, the multiplex transmission including uplink data multiplexed with the aperiodic CSI feedback, the aperiodic CSI feedback transmitted by the user equipment in response to the user equipment determining that a predetermined condition is satisfied, the controller is configured to transmit, to the user equipment, a type of a reference signal used for measuring the downlink channel state and a resource set of the reference signal, the type of the reference signal is a Multicast-Broadcast Single-Frequency Network Reference Signal (MBSFN-RS) when Multicast-Broadcast Single-Frequency Network (MBSFN) transmission is set in the user equipment by the base station, and the type of the reference signal is a Cell-specific Reference signal (CRS) when Single Cell Point-To-Multipoint (SC-PTM) transmission is set in the user equipment by the base station.

10. A chipset for controlling a user equipment comprising:

a processor and a memory coupled to the processor, the processor configured to transmit an aperiodic Channel State Information (CSI) feedback related to a downlink channel state to a base station, wherein in response to determining that a predetermined condition is satisfied, the processor is configured to transmit the aperiodic CSI feedback in a multiplex transmission to the base station using a Physical Uplink Shared Control Channel (PUSCH) resource, the multiplex transmission including uplink data multiplexed with the aperiodic CSI feedback, the processor is configured to receive, from the base station, a type of a reference signal used for measuring the downlink channel state and a resource set of the reference signal, the type of the reference signal is a Multicast-Broadcast Single-Frequency Network Reference Signal (MBSFN-RS) when Multicast-Broadcast Single-Frequency Network (MBSFN) transmission is set in the user equipment by the base station, and the type of the reference signal is a Cell-specific Reference signal (CRS) when Single Cell Point-To-Multipoint (SC-PTM) transmission is set in the user equipment by the base station.

\* \* \* \* \*